US008184526B2

(12) United States Patent
Duncan et al.

(10) Patent No.: US 8,184,526 B2
(45) Date of Patent: May 22, 2012

(54) SYSTEMS AND METHODS FOR CONNECTIVITY FAULT MANAGEMENT EXTENSIONS FOR AUTOMATED ACTIVATION OF SERVICES THROUGH ASSOCIATION OF SERVICE RELATED ATTRIBUTES (75) Inventors: Ian Duncan, Ottawa (CA); Daniel Rivaud, Ottawa (CA); Raghuraman Ranganathan, Bellaire, TX (US)

(73) Assignee: Ciena Corporation, Linthicum, MD (US)

( * ) Notice: Subject to any disclaimer, the term of this patent is extended or adjusted under 35 U.S.C. 154(b) by 238 days.

(21) Appl. No.: 12/559,888

(22) Filed: Sep. 15, 2009

(65) Prior Publication Data

US 2010/0238791 A1     Sep. 23, 2010

Related U.S. Application Data (60) Provisional application No. 61/096,886, filed on Sep. 15, 2008.

(51) Int. Cl.
*G01R 31/08* (2006.01)
(52) U.S. Cl. ........................................ 370/216
(58) Field of Classification Search .......... 370/216, 370/244
See application file for complete search history.

(56) References Cited

U.S. PATENT DOCUMENTS

| 7,889,754 | B2* | 2/2011 | Dec et al. .......... 370/432 |
| 2006/0159008 | A1* | 7/2006 | Sridhar et al. ........ 370/216 |
| 2009/0109837 | A1* | 4/2009 | Kini et al. ........... 370/216 |
| 2009/0234969 | A1* | 9/2009 | Mohan et al. ......... 709/242 |

* cited by examiner

*Primary Examiner* — Derrick Ferris
*Assistant Examiner* — Angel Brockman
(74) *Attorney, Agent, or Firm* — Clements Bernard PLLC; Christopher L. Bernard; Lawrence A. Baratta, Jr.

(57) ABSTRACT

The present disclosure provides systems and methods for Ethernet Connectivity Fault Management (CFM) extensions to provide a CFM messaging mechanism for support of information exchange and the like, in addition to end-to-end connectivity and fault management. In an exemplary embodiment, the present invention utilizes CFM extensions to provide Pseudowire (PW) MAC addressing. Here, the present invention can enable the exchanging of MAC addresses and other attributes for PDH pseudowire transport. Advantageously, this avoids involving the OSS/EMS/NMS in pre-provisioning these necessary but arbitrary attributes across the network elements supporting a pseudowire service. Also, the present invention can be extended to support numerous other applications involving sharing of attributes between nodes over the extensions provided herein.

15 Claims, 7 Drawing Sheets

SYSTEMS AND METHODS FOR CONNECTIVITY FAULT MANAGEMENT EXTENSIONS FOR AUTOMATED ACTIVATION OF SERVICES THROUGH ASSOCIATION OF SERVICE RELATED ATTRIBUTES

CROSS-REFERENCE TO RELATED APPLICATION(S)

The present non-provisional patent application/patent claims the benefit of priority of U.S. Provisional Patent Application No. 61/096,886, filed on Sep. 15, 2008, and entitled "SYSTEMS AND METHODS FOR CONNECTIVITY FAULT MANAGEMENT EXTENSIONS FOR AUTOMATED ACTIVATION OF SERVICES THROUGH ASSOCIATION OF SERVICE RELATED ATTRIBUTES," the contents of which are incorporated in full by reference herein.

FIELD OF THE INVENTION

The present invention relates generally to communication networks. More particularly, the present invention relates to systems and methods utilizing Ethernet Connectivity Fault Management (CFM) extensions to provide a CFM messaging mechanism for support of information exchange and the like, such as, for example, for providing Pseudowire (PW) labels, other PW parameters for the underlying transport tunnel between service end nodes such as Media Access Control (MAC) PW peer addressing and 802.1ad VLAN Identifiers (VID).

BACKGROUND OF THE INVENTION

Connectivity Fault Management (CFM) is an Ethernet standard defined in IEEE 802.1ag to provide many common Operations, Administration, and Maintenance (OAM) functions associated with underlying network transport for services. For example, CFM allows for the discovery and verification of the path, through 802.1 bridges and LANs. CFM also defines Maintenance Domains, their constituent Maintenance Points, and the managed objects required to create and administer them. CFM defines the relationship between Maintenance Domains and the services offered by VLAN-aware Bridges and Provider Bridges, describes the protocols and procedures used by Maintenance Points to maintain and diagnose connectivity faults within a Maintenance Domain, and provides for future expansion of the capabilities of Maintenance Points and their protocols.

Figure 1:
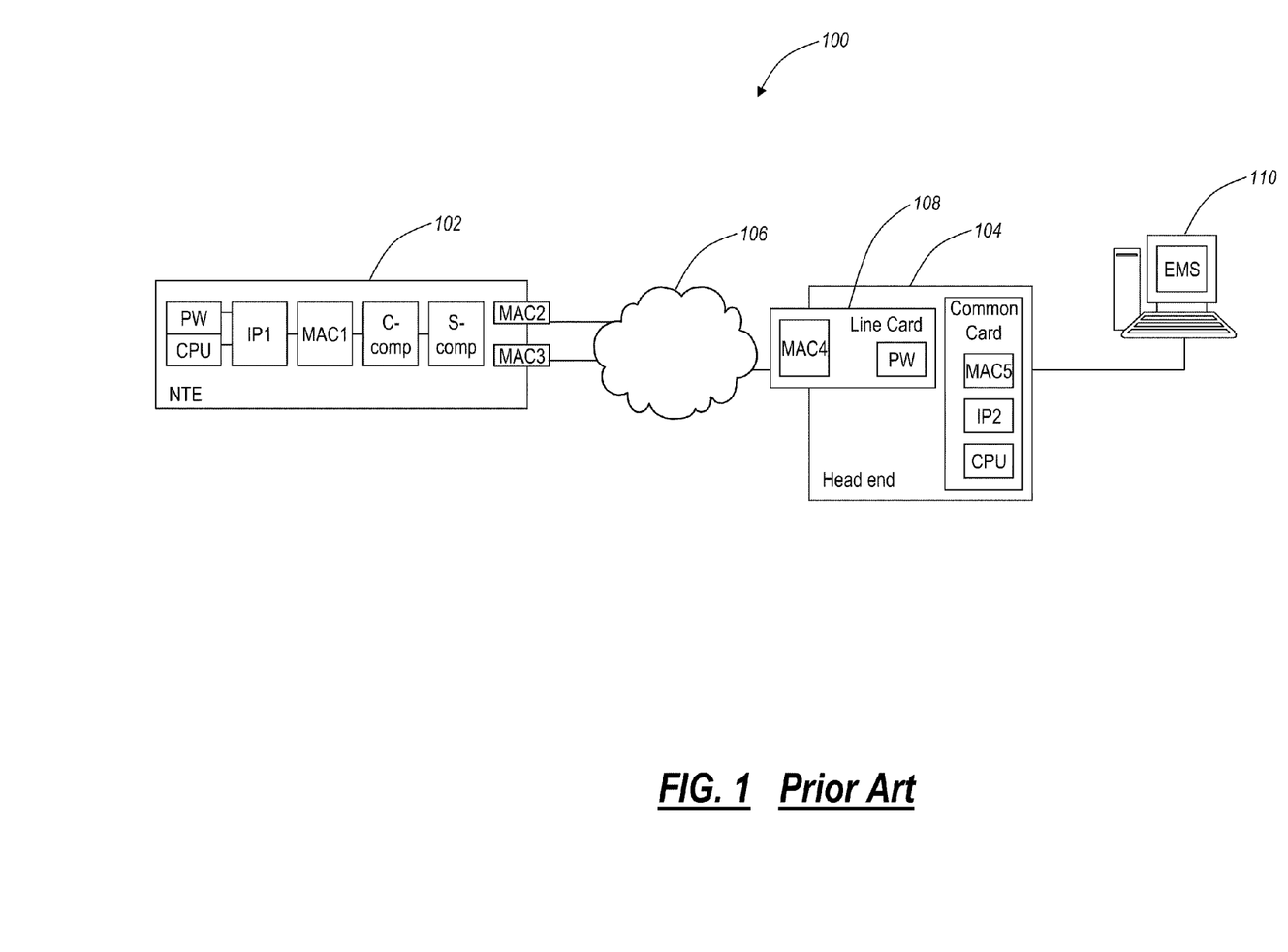
FIG. 1 is a network diagram including Network Termination Equipment (NTE) at an edge of the network connected to an aggregated head end over a layer two network.

Referring to FIG. 1, a network 100 can include Network Termination Equipment (NTE) 102 at an edge of the network 100 connected to an aggregated head end 104 over a layer two network 106. PseudoWires (PWs) are one type of service that runs between the NTE 102 and the head end 104, and PWs can be used for transporting encapsulated Time Division Multiplexed (TDM) or Asynchronous Transfer Mode (ATM) services, for example. Each PW is identified by a PW label. The PWs run on top of tunnels. The tunnels are identified in the case of 802.1ad by port Media Access Control (MAC) Destination Address (DA), Virtual Local Area Network (VLAN) IDs, and the like, and in the case of 802.1Qay by the Backbone Service Instance Identifier (I-SID) with the Provider Backbone Bridge with Traffic Engineering (PBB-TE) trunk, which in turn is identified by the three-tuple of the Backbone Source Address (B-SA), Backbone Destination Address (B-DA) and the Backbone VLAN Identifier (B-VID). Currently, to provision a PW requires the underlying tunnel information to also be provisioned. However, some of the underlying tunnel attributes are associated with the hardware (HW) rather than with the PW service (e.g., port MAC address is a HW specific attribute). So if a physical line card (LC) 108 is replaced on the head end 104, the MAC address associated with the LC 108 changes and, therefore, the underlying tunnel is no longer valid and must be re-provisioned at the far-end NTE 102. For example, replacing LCs 108 is common in the network 100 for a variety of reasons, e.g. failures, upgrades, and the like.

Disadvantageously, this is cumbersome for network operators for the following reasons: network operators do not want to provision MAC addresses across their network, i.e. operators are used to MAC learning in layer two networks that do not require MAC address provisioning; when the LC 108 HW is changed, the technician changing the HW is not necessarily the right person to re-configure the PW service again; provisioning of far-end HW attributes leads to complex interdependencies and therefore misconfiguration errors; and there could be numerous (e.g., thousands) of PW services, causing significant scalability issues at an Element Management System 110.

Advantageously, network operators would find it useful to extend CFM and the like to distribute various service attributes to end points, such as, the attributes associated with PWs and other service constructs associated with a given tunnel Maintenance Endpoint Group (MEG).

BRIEF SUMMARY OF THE INVENTION

The Ethernet Connectivity Fault Management (CFM) architecture, as currently being standardized, provides an impressive framework for addressing end-to-end Ethernet Connectivity and Fault Management at any level of the hierarchy. In various exemplary embodiments, the present invention provides systems and methods utilizing CFM extensions to provide a CFM messaging mechanism for the support of information exchange and the like, in addition to end-to-end connectivity and fault management. In an exemplary embodiment, the present invention utilizes CFM extensions to provide Pseudowire (PW) port MAC addressing. Here, the present invention can enable the exchanging of MAC addresses and other attributes for PDH pseudowire peer MAC addresses. Advantageously, this avoids involving the OSS/EMS/NMS in pre-provisioning these necessary but arbitrary attributes across the network elements supporting a pseudowire service. Also, the present invention can be extended to support numerous other applications involving the sharing of attributes between nodes over the extensions provided herein.

In one exemplary embodiment, the present invention provides a method extending Ethernet Connectivity Fault Management, including: provisioning a set of two or more End Points; exchanging a sequence of Ethernet Connectivity Fault Management messages between the End Points, wherein the Ethernet Connectivity Fault Management messages include values for defined attributes of the services supported amongst the End Points; and processing the Ethernet Connectivity Fault Management messages at remote End Points to extract the attributes. The method also includes updating a remote End Point responsive to the attributes. The method further includes provisioning a pseudowire service between a headend End Point to a remote End Point. The method still further includes updating the pseudowire service at the remote End Point responsive to the attributes of the headend End Point. The attributes include a Media Access Control address for the headend End Point. The headend End Point includes a head end node including a line card for operating the pseudowire service; and the method further including: performing one of replacing the line card with a second line card and protection switching to the second line card; exchanging a second Ethernet Connectivity Fault Management message from the headend End Point to the remote End Point, wherein the message includes a Media Access Control address for the second line card; processing the second Ethernet Connectivity Fault Management message at the remote End Point to extract the attributes; and updating the remote End Point responsive to the Media Access Control address for the second line card. The Ethernet Connectivity Fault Management message includes a Continuity Check Message.

In another exemplary embodiment, the present invention provides a network extending Ethernet Connectivity Fault Management, including: network termination equipment; a head end including a first line card, wherein the first line card is communicatively coupled to the network termination equipment over a layer two network; and an extension to Ethernet Connectivity Fault Management to provide sharing of attributes between the network termination equipment and the head end. The network also includes an element management system connected to the network termination equipment and the head end. The network further includes a pseudowire service between the network termination equipment and the head end. The pseudowire service is provisioned by the extension to Ethernet Connectivity Fault Management for hardware-related attributes. The hardware-related attributes include Media Access Control addresses.

In a further exemplary embodiment, the present invention provides a method, including: creating a tunnel between a first node and a second node; operating Ethernet Connectivity Fault Management between the first node and the second node; exchanging the tunnel attributes between the first node and the second node using Continuity Check Messages; and revising the tunnel attributes responsive to the Continuity Check Messages. An Ethernet Connectivity Fault Management service is identified by a Maintenance Association ID common to both ends of the tunnel and carried bidirectionally in the Continuity Check Messages. The method also includes, at a local device, receiving a Continuity Check Message belonging to a provisioned Maintenance Association; validating the received Continuity Check Message to determine a remote End Point and associated ID; and discovering and continuously revising a variable comprising Media Access Control addresses of the remote End Point. The method further includes binding between the Maintenance Association and a pseudowire service.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods utilizing Ethernet Connectivity Fault Management (CFM) extensions to provide a CFM messaging mechanism for the support of information exchange and the like. In an exemplary embodiment, the present invention utilizes CFM extensions to provide Pseudowire (PW) peer MAC addressing. Here, the present invention can enable the exchanging of MAC addresses and other attributes for PDH pseudowire transport. Advantageously, this avoids involving the OSS/EMS/NMS in pre-provisioning these necessary, but arbitrary, attributes across the network elements supporting a pseudowire service.

Carrier Ethernet is evolving to support the needs of the carrier network environment. Carrier Ethernet requires scalable and reliable mechanisms to support operations, administration, management and provisioning (OAMP) and traffic engineering (TE). Standards have been developed in the Metro Ethernet Forum (MEF), ITU, and IEEE providing many of these required extensions. These however are incomplete when one considers the provisioning and monitoring of the network services that carriers deliver to their various customers.

The present invention provides extensions utilizing CFM and the like to distribute various services attributes to end points. Many of these attributes can be dynamic in nature, changing periodically based on time-of-day, day-of-week, etc. or in relationship to changes in equipment, network point of attachment, etc. In addition to pseudowire (PW) MAC addressing, the present invention can provide additional applications and value to Ethernet networks enabling distribution of attributes over CFM. Advantageously, such applications can remove operator involvement in service designations once a service is up with CFM.

The IEEE 802.1ag Connectivity Fault Management (CFM) standard provides many of the common OAM functions associated with the underlying network transport for services. Fundamental to CFM is the concept of a Maintenance Association (MA), which is the identified network transport construct spanning the various network nodes underlying a given service or set of services. CFM relies on well defined messages exchanged between the network elements, specifically and in particular each End Point (MEP) that provides origination and termination of the service transport path(s) for a MA.

This invention makes use of the CFM messaging mechanism by extending the defined message types and the forms of information carried within the messages. Specifically, this invention extends CFM to support a necessary and useful exchange of attributes associated with a given MEP that have been provisioned, been dynamically acquired, or are intrinsic to equipment supporting the MEP. This exchange of attributes enables the network elements to provide automatic establishment and dynamic re-configuration of a service using layer-two constructs including:

'Automatic establishment' includes service attributes that might otherwise be provisioned, commissioned, or communicated by higher-layer signaling.

'Dynamic re-configuration' includes discovery and learning in response to various changes in the network such as: port/interface status changes, protection switching, etc.

Examples of 'services' are: Various kinds of PseudoWire (PW) tunnels (TDM, ATM, Ethernet, HDLC, etc.), Provider Backbone Bridge/Provider Backbone Bridging Traffic Engineering (PBB/PBB-TE) tunnels, protection tunnels, Ethernet LAN (ELAN), Ethernet Private Line (ELINE), MPLS-TP tunnels, etc.

'Layer-2 constructs' can include 802.1ag Connectivity Fault Management (CFM), Queue-in-Queue (QinQ), PBB, PBB-TE, 802.1ah in the First Mile OAM, Link Layer Discovery Protocol (LLDP), Link Aggregation Control Protocol (LACP), G.8031 Automatic Protection Switching (APS), Rapid Spanning Tree, inter-frame-gap channels, 802.3 control frames (e.g. PAUSE), etc.

Figure 2:
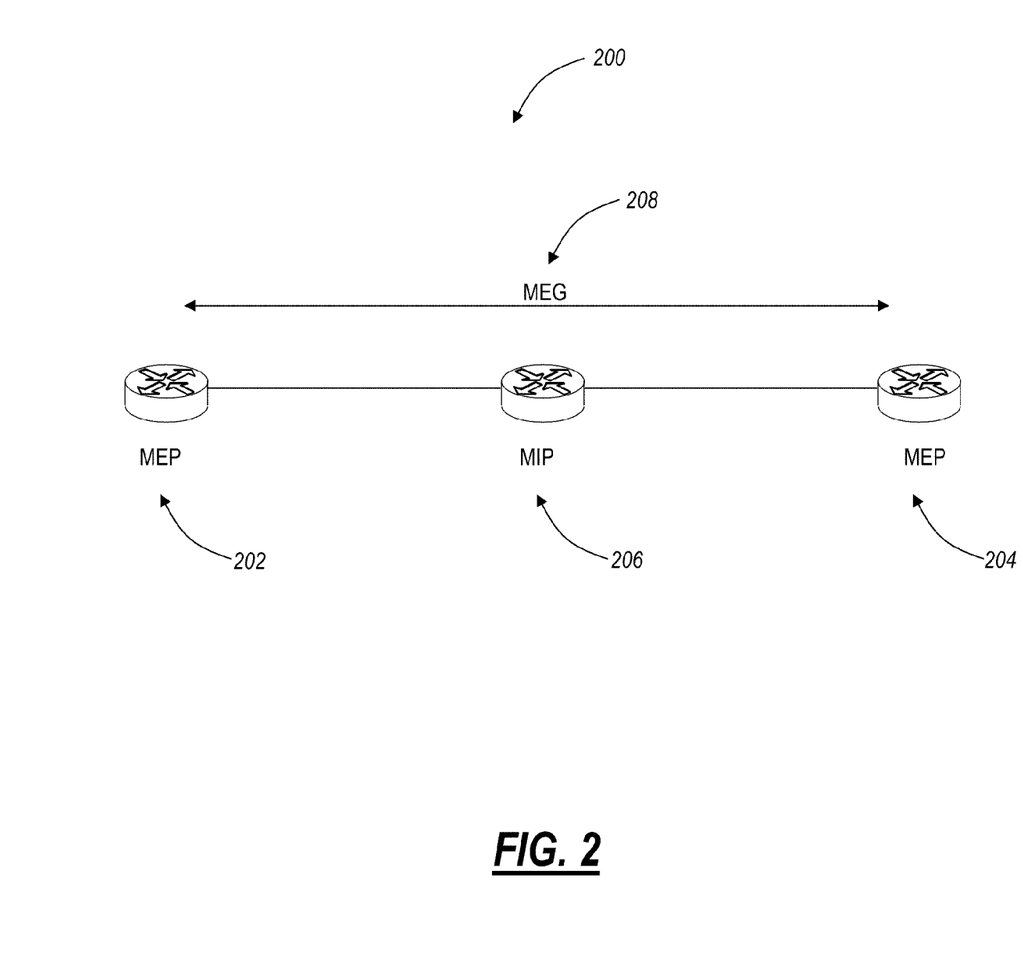
FIG. 2 is a diagram of a reference Ethernet path configured with Ethernet OAM mechanisms according to an exemplary embodiment of the present invention.

Referring to FIG. 2, a reference Ethernet path 200 configured with Ethernet OAM mechanisms is illustrated according to an exemplary embodiment of the present invention. The reference Ethernet path 200 includes three interconnected routers/switches 202, 204, 206. The routers/switches 202, 204 are defined as a Maintenance Association End Point (MEP). A MEP is configured to source and sink CFM frames, i.e. source and sink within a single configured MD (Maintenance Domain), pass-thru if MD Level is higher than the configured level for the MEP, and discard if MD Level is lower. In a point-to-point network, there are two MEP nodes at the endpoints, and in a local area network (LAN) configuration, there can be multiple MEP nodes. Also, a CFM domain having one or more Maintenance Intermediate Point (MIP) nodes may be bounded by a plurality of MEP nodes. In order that CFM frame flows are appropriately filtered so that they are processed only by the intended domain's nodes, the MEP/MIP population of an Ethernet CFM network is configured appropriately.

The router/switch 206 is defined as a MIP which resides between MEPs. A MIP is configured to process and forward CFM frames, but does not initiate CFM frames. Although a MIP does not initiate protocol transactions, it does transmit Loopback Reply (LBR) and Linktrace Reply (LTR) messages in response to received Loopback Message (LBM) and Linktrace Message (LTM) messages respectively. As described herein, MEP and MIP terminology is used for nodes present at endpoints and intermediate points, respectively, in an Ethernet Path. Also, the Ethernet Path terminology is used to denote a point-to-point Ethernet connection between two nodes, e.g. the connection being built using Virtual Local Area Network (VLAN) cross connection or unicast Ethernet Media Access Control (MAC) plus VLAN connection. Additionally, other types of Ethernet paths, such as, for example, Provider Backbone Bridging-Traffic Engineering (PBB-TE), MPLS-TP, and the like are also contemplated by the present invention.

Additionally, the routers/switches 202, 204, 206 are configured in a Maintenance Entity Group (MEG) 208 which enable a grouping of nodes in a maintenance group for OAM to be grouped on different spans. A Maintenance Entity (ME) is a maintenance relationship between two MEPs. Additionally, MEG 208 allows for nesting of various groups.

Ethernet OAM mechanisms can utilize Continuity Check Messages (CCMs) for end-to-end path protection (EEPP) fault detection. CCMs are polling-based, asynchronous, and bidirectional by way of two independent unidirectional keep alives. Each MEP 202, 204 sends a CCM frame periodically to its peer MEP 202, 204. All MEPs 202, 204 are configured with the same periodic interval, and this is also signaled in the frame for verification. Each MEP 202, 204 expects to receive a CCM frame by the end of that periodic interval. Non-receipt of three consecutive frames results in a fault. This fault is indicated in Remote Defect Indication (RDI) bit of a CCM frame sent to a peer. This is useful for one-way fault conditions.

A MEP exits the fault state only after receiving three consecutive CCM frames each at the specified interval. Additionally, the CCM can detect misconnections by comparing MEG and MEP identifiers (ID) from the frame with configured values. CCMs can be used per VLAN per MEG level. Each CCM is sent at the highest priority and is ineligible for discard. For scaling purposes of CCM processing, some level of hardware support is typically utilized. Note, MIPs 206 conventionally do not process CCM frames, but rather simply forward them along based on frame forwarding criteria in the path (i.e., VLAN swap for VLAN cross-connects, destination MAC plus VLAN based forwarding for bridge path).

CCMs can be utilized for fault detection in ring-based Ethernet topologies. Self-healing Ethernet topologies are disclosed in commonly assigned U.S. patent application Ser. No. 10/855,596, filed Sep. 14, 2007, and entitled "SYSTEMS AND METHODS FOR A SELF-HEALING CARRIER ETHERNET TOPOLOGY," and in commonly assigned U.S. patent application Ser. No. 11/962,366, filed Dec. 21, 2007, and entitled "SYSTEMS AND METHODS FOR SCALABLE AND RAPID ETHERNET FAULT DETECTION," the contents of both are incorporated in-full by reference herein.

The present invention provides mechanisms to extend CFM messaging, such as CCM messages or the like, to exchange of attributes between the MEPs 202, 204. Examples for the mechanisms within the IEEE CCM definition include Reserved bits in Flags field, Organization-Specific TLV, MAID, etc. These mechanisms can apply to all Ethernet topologies.

Figure 3A:
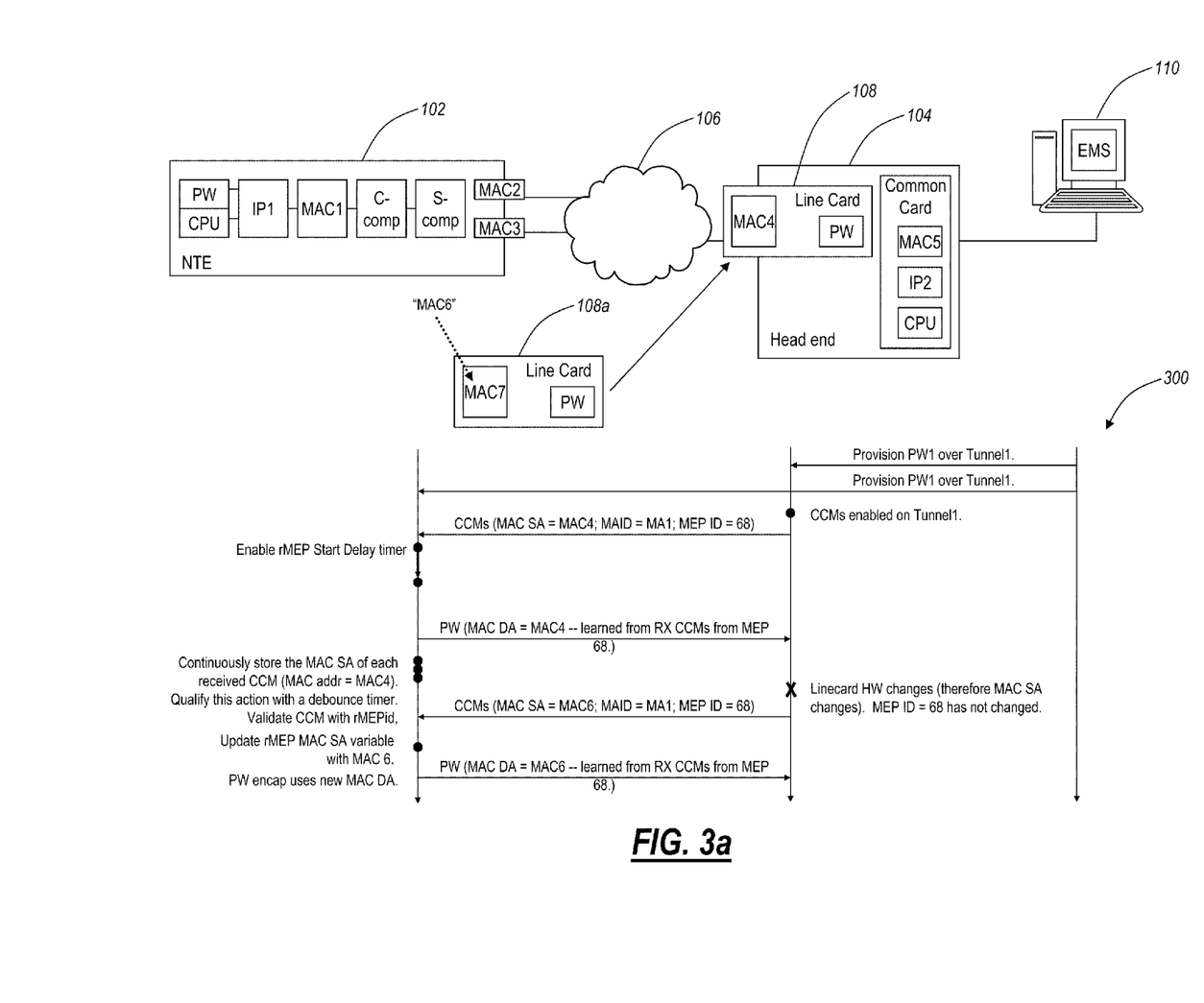
FIGS. 3a-3b are a diagram and table of Connectivity Fault Management (CFM) Media Access Control (MAC) discovery and binding for PW according to an exemplary embodiment of the present invention.
Figure 3B:
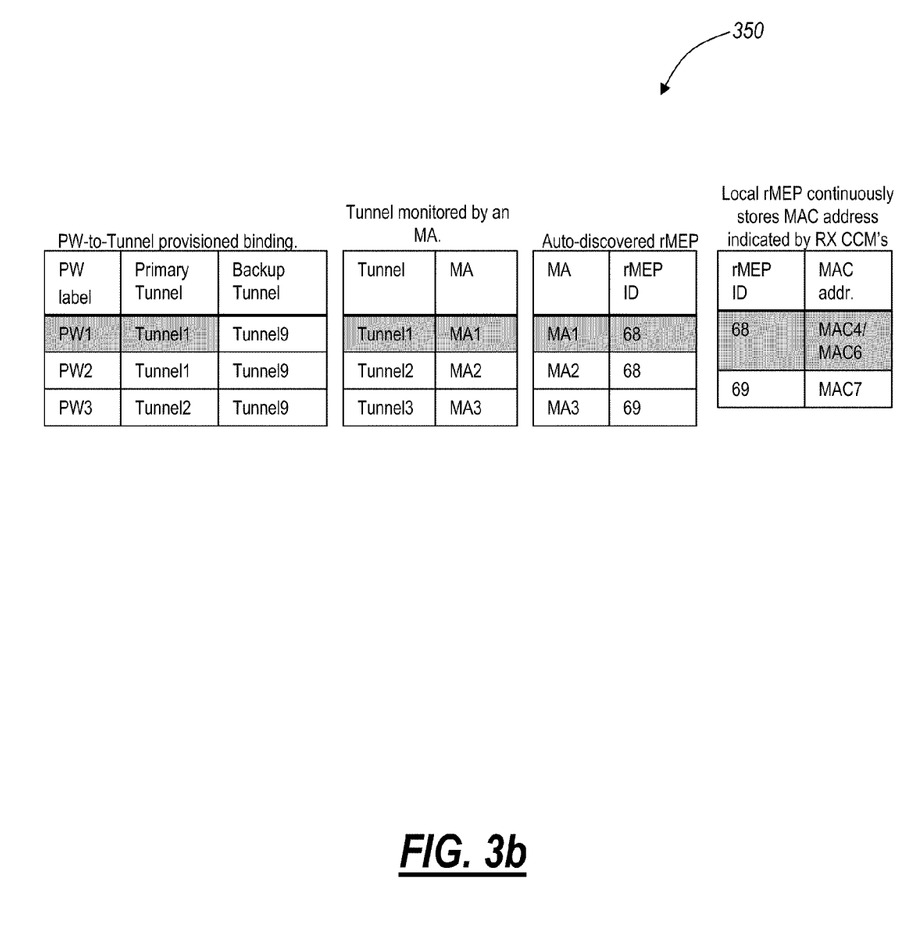

Referring to FIGS. 3a-3b, CFM MAC discovery and binding 300 is illustrated for PW according to an exemplary embodiment of the present invention. The present invention can use CFM Continuity Check Messages (CCM) to continuously exchange and revise tunnel attributes and the like in addition to performing normal CFM functions such as monitoring or protection switching.

As described herein, CCMs are "heart-beat" multicast messages issued periodically by Maintenance End Points (MEPs). They allow MEPs to detect loss of service connectivity amongst themselves. They also allow MEPs to discover other MEPs within a Domain, and allow Maintenance Intermediate Points to discover MEPs. In the present invention, CCM messages are extended to enable attribute sharing between MEPs.

A CFM service is identified by the MA (Maintenance Association) ID. The MAID is common to both ends of the tunnel and is carried bidirectionally in CC messages. A MAID must be provisioned at both ends to establish a CFM service. When a local device receives a CC message belonging to a provisioned MA, it will filter based on the MA level and MAID before validating against provisioned remote MEP and its MEP ID. An invalid MAID due to rogue MEPs results in unknown MAID alarm. It also discovers and continuously revises a variable containing the remote MEP's MAC addresses.

A sub-domain maintenance association (SDMA) is a set of paths that represents the connectivity between edge nodes within a sub-domain. The state of a path to a remote node in a sub-domain can be represented by a remote maintenance association end point (rMEP) state. This rMEP is a more specific instance of the MEP as defined by ITU-T Y.1731 and IEEE 802.1ag, corresponding to a MEP that is logically not collocated with the device for which the SDMA is being populated. Of course, it is understood that an rMEP can be associated with multiple SDMAs. This is the case because sub-domains can overlap, i.e., share the same nodes and/or end points. It is also noted that an SDMA can include a subset of the rMEPs monitored by a maintenance association (MA).

A binding between MA and PW must be provisioned at both peers. This allows the PW function at each peer to use the far-end MAC address information received from the CC messages at the same MA level, i.e., between MEP peers. For example, a CC message is received and its source MAC address is stored for use as the destination MAC address for the tunnel between peers carrying multiple PWs.

The CFM MAC discovery and binding 300 is illustrated with respect to the network 100 and shows various events at each of the NTE 102 and the head end 104 in a simplified unidirectional case. In the present invention, PWs must run over Ethernet tunnels because CFM is only defined for Ethernet. If a remote maintenance association end point (rMEP) at the NTE 102 stops receiving CCMs, it raises a fault condition. The PW can continue to send to the MAC address indicated by the CCM. If there have been no CCMs for AGEoutTimer, the PW is disabled. If the NTE 102 rMEP is administratively disabled, the PW is automatically disabled also. If protection is enabled, the Protection Switch Entity (PSE) must also change the PW-to-rMEPid binding during a protection switch. Also, Dual-homing protection scenarios will work with the present invention.

Each tunnel is characterized by the endpoint MAC addresses and a S-VID. PWs are mapped to tunnels (many-to-one mapping is okay). Each tunnel auto-discovers the far end MEP ID and continuously updates a variable containing the far-end MEP's MAC address. The far-end MEP MAC address is used as the MAC DA for the tunnel's transmitted packets. The present invention can also carry the MAC address in a vendor-specific TLV along with other service-related attributes. This allows various nodes to reconcile service attributes (e.g. master/slave, reversion, name of service, forwarding modes, etc.). It can also allow single-ended service re-provisioning.

FIG. 3a illustrates a flow between the NTE 102, the head end 104, and the EMS 110, and FIG. 3b illustrates tables 350 of various attributes. The CFM MAC discovery and binding 300 includes provisioning a PW1 over a tunnel1. The tunnel1 is provisioned through the EMS 110 at the head end 104 and at the NTE 102. Once provisioned, CCMs are enabled on the tunnel1. From this, a CCM is provided from the head end 104 to the NTE 102 with attributes, such as, for example, MAC SA=MAC4; MAID=MA1; MEP ID=68. Note, this is shown uni-directionally only for illustration purposes, and those in the art will recognize that a similar mechanism can flow from the NTE 102 to the head end 104.

Upon receiving a first CCM at the NTE 102 with the required PW attributes, a rMEP start delay timer is engaged. Upon expiration of the timer, the rMEP is automatically brought into an operational state at the NE 102. Note, this can occur for various rMEPs not necessarily associated with PWs. The NTE 102 is configured to learn the MAC address, i.e. MAC4 from CCMs from MEP 68. The present invention contemplates extensions to existing CCMs to add new general and sub messages to provide MAC attributes, PW label info, and the like to one end, i.e. NTE 102.

These attributes can be provided from the head end 104 to the NTE 102 over existing CCM messages, over newly defined CCM messages, newly defined CFM messages, and the like. MAC addresses can be in CFM headers. A CFM PDU does not include MAC SA, DA, Ethertype, and Frame Count Scope (FCS). A CFM PDU can be encapsulated by an Ethernet 802.3 frame, which includes these fields. NOTE: The common CFM PDU contains MD Level, Version, OpCode, Flags, and type-length-value (TLVs). A CCM PDU has the common headers plus: Sequence #, MAID, and optional CCM TLV's. However, the NTE 102 does not retrieve this as the MAC address because, for PW, a MEP may be in one spot, but the PW is in another, so the MAC addresses could be different. Instead, the present invention contemplates providing the MAC address (MAC4 from head end 104) as part of a CFM message, e.g. 40 bits sealed.

Both the NTE 102 and the head end 104 include hardware and/or software configured to process CFM messages in accordance with IEEE 802.1ag. In the present invention, the hardware and/or software includes modifications to support the processing of the CFM extensions provided herein. Additionally, the hardware and/or software includes the ability to configure attributes responsive to these extensions. For example, the NTE 102 is configured to learn the MAC address (MAC4 from head end 104) from received CCMs from MEP 68. The NTE 102 also configures the PW with this learned MAC address, removing requirements to manually provision such attributes.

The NTE 102 continuously stores the MAC source address (SA) of each received CCM from the head end 104. In this example, the head end 104 has the LC 108 changed, i.e. adding the LC 108a, and therefore the MAC SA changes but MEPIP=68 does not. For example, the LC 108 can be changed responsive to a card failure, card replacement, protection switch, and the like. The presence of same MAID allows for additional validation of the received CCM frame before updating the rMEP MAC address. The NTE 102 notes this change in MAC SA through the CCM messages, and updates the rMEP MAC address (e.g., from the old MAC4 to the new MAC6). Accordingly, the NTE 102 now encapsulates the PW using the new MAC DA (e.g., MAC6). Advantageously, this enables a change in LC 108 without requiring manual updating of the PW.

With regard to CFM MAC discovery and binding 300, the present invention enables no provisioning of far-end HW-related attributes, i.e. only provision service attributes; automatic discovery of MAC address and remote MEP ID, i.e. No MAC address provisioning required. The present invention requires no layer three (Internet Protocol) signaling which allows for an inexpensive NTE 102, i.e. no layer three processing required—only layer two. This plays well in a MEF8 environment compared to an MPLS environment. The present invention can work with layer two protection switching schemes. In particular, the solution maintains communication over standby tunnels in 1:1 no-load-balance protection topologies. The standby tunnels do not carry data traffic and cause problems for other solutions (e.g. IP MPLS signaling would be allowed to flow on the active tunnel, but not the standby tunnel).

The present invention contemplates the exchange of other attributes over the CFM extensions described herein. For example, these attributes could include traffic engineering related attributes, PW identifiers, etc. The present invention can also be utilized in lieu of spanning tree algorithms for VLAN configuration. Additionally, the present invention can be utilized to provide an explicit exchange of provisioning information between both ends, such as for reconciliation. For example, these could include service name, customer name, circuit ID, etc., and each node could raise an alarm if there is a mismatch over the CFM extensions. Also, the attributes could include protection attributes between two PWs, for example.

Figure 4:
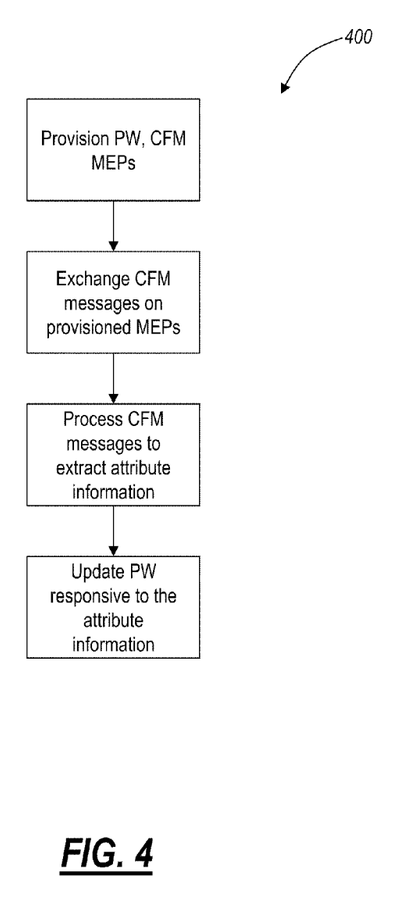
FIG. 4 is a flowchart of an exemplary CFM extension mechanism according to an exemplary embodiment of the present invention.

Referring to FIG. 4, a flowchart 400 illustrates an exemplary CFM extension mechanism according to an exemplary embodiment of the present invention.

Figure 5:
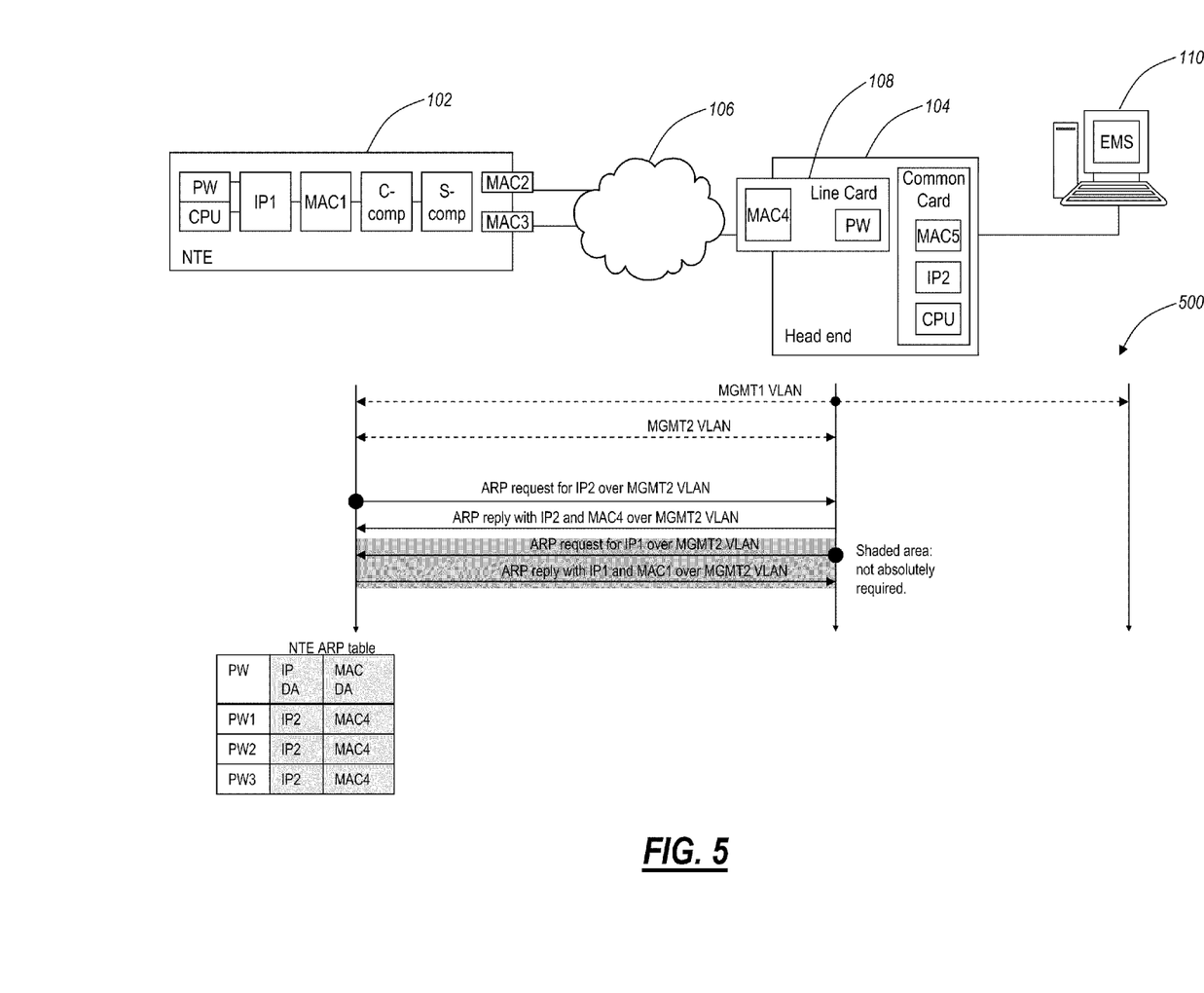
FIG. 5 is a diagram of Address Resolution Protocol (ARP) between the NTE and the head end according to an exemplary embodiment of the present invention.

Referring to FIG. 5, Address Resolution Protocol (ARP) 500 between the NTE 102 and the head end 104 is illustrated according to an exemplary embodiment of the present invention. ARP 500 adopts/endorses an IP-based protocol (layer three) unlike the CFM MAC discovery and binding 300. ARP 500 can also be utilized to update PW attributes, such as MAC address. ARP broadcasts could be problematic in the layer two network 106.

Note, the NTE 102 can be modular, i.e. no LCs, or it could include LCs. If it is modular, then HW replacements require a complete reconfiguration and reprovisioning by the EMS 110. At the head end 104, changing a LC 108 does not affect its IP address. So for a modular NTE 102, the NTE 102 could discover the head end's 104 MAC, but not the other way around. In the present invention, the head end 104 could send a Gratuitous ARP when its HW changes (e.g., LC 108) and expect re-provisioning if the NTE 102 HW changes. However, the ARP 500 does not work well in dual-homing scenarios with protection because ARP does not pass over the standby tunnel—only CCMs make it through.

In the example of FIG. 5, there is a management VLAN (MGMT1 VLAN) between the EMS 110 and the NTE 102, and a management VLAN (MGMT2 VLAN) between the NTE 102 and the head end 104. The NTE 102 provides an ARP request for IP2 over the MGMT2 VLAN, and the head end 104 replies with IP2 and MAC4 over the MGMT2 VLAN.

Figure 6:
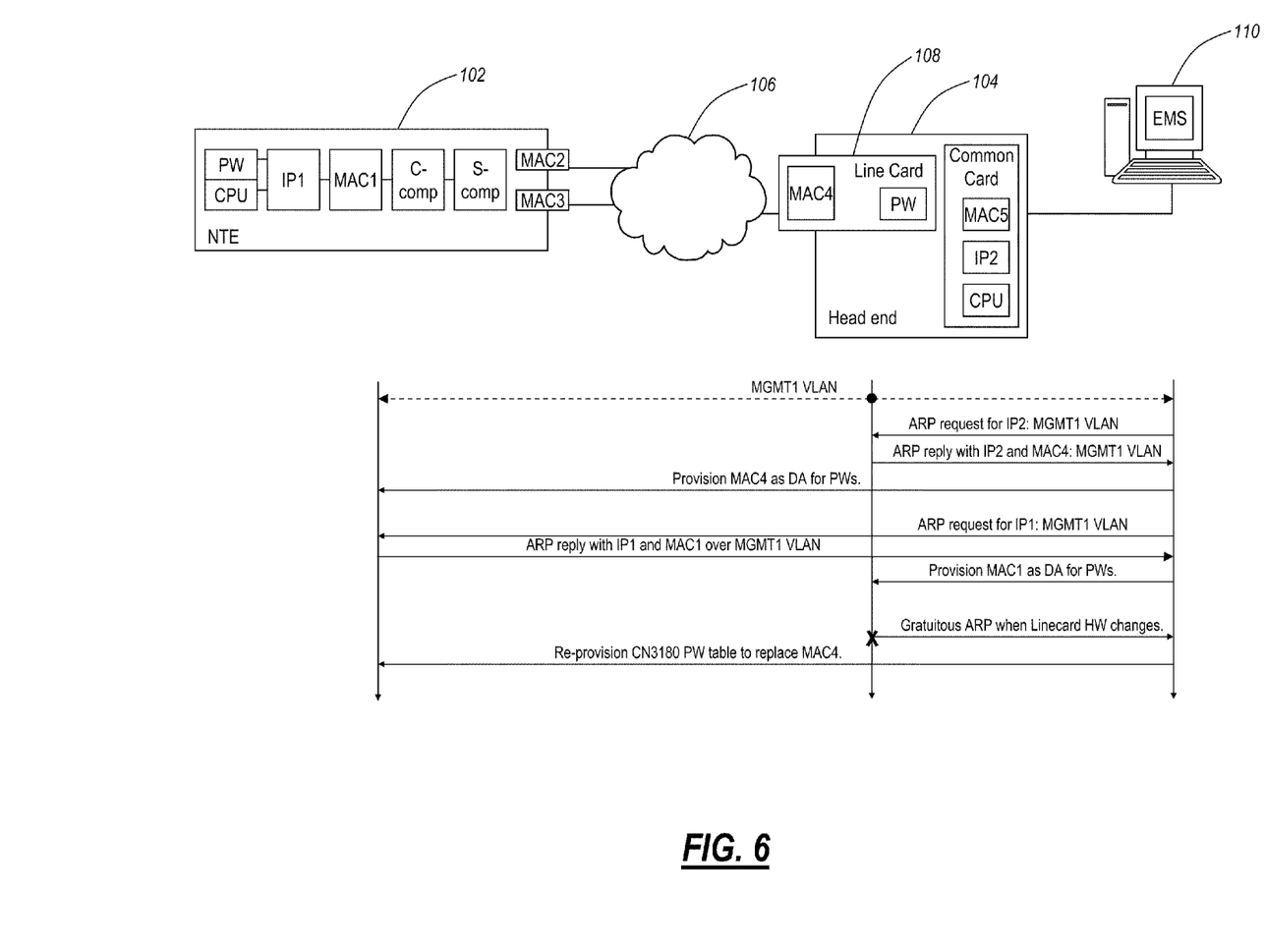
FIG. 6 is a diagram of ARP between the EMS and each of the NTE and the head end according to an exemplary embodiment of the present invention.

Referring to FIG. 6, EMS ARP 600 between the NTE 102 and the head end 104 is illustrated according to an exemplary embodiment of the present invention. Here, the EMS 110 uses ARP to track HW changes and performs re-provisioning, such as in the NTE 102 and the head end 104. The EMS ARP 600 requires that the NTE 102 and the head end 104 (along with any other nodes using EMS ARP 600) be managed by the EMS 110. The EMS ARP 600 can provide reprovisioning triggered by ARP, an alarm, or the like. The discovery of MAC addresses by the EMS 110 can be through ARP or another management protocol. Alternatively, the EMS 110 can use a floating pool of MAC addresses that it doles out. This requires the EMS 110 to manage MAC address and to include recovery from error scenarios (e.g. doling out same MAC twice). The EMS 110 is configured to assign and manage the pool of MAC addresses. The EMS ARP 600 works in dual-homing protection scenarios because ARPs always traverse the active tunnel. However, this needs multiple IP addresses to identify the different PW MAC addresses.

As an alternative to the above embodiments, it should be noted that the concepts of the present invention can be readily extended to MPLS-TP and MPLS-TP tunnels. In this regard, CFM can include MPLS-TP OAM methods and CFM PDUs can be utilized over GACH/GAL, as opposed to just the utilization of 802.1ag techniques. Other traffic attributes that can be updated via the systems and methods of the present invention include TE-related attributes for use in MPLS-TE/TP. The present invention can provide a CFM-TE that distributes MIP-to-MIP segment attributes, such as delay/jitter, max BW, max reservable BW, unreserved BW, shared-risk link groups, utilization, etc. Finally, specific reconciliations of a service may be performed at both ends, for example, the properties of groups of TE links at both ends. Note, the use of a common channel to exchange MP attributes as well as CP attributes is workable as different processors are used to handle the execution of instructions associated with each.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method extending Ethernet Connectivity Fault Management, comprising:
   provisioning a set of two or more End Points;
   exchanging a sequence of Ethernet Connectivity Fault Management messages between the End Points, wherein the Ethernet Connectivity Fault Management messages comprise values for defined attributes of the services supported amongst the End Points in extensions to the Ethernet Connectivity Fault Management messages, and wherein the extensions to the Ethernet Connectivity Fault Management messages are transmitted over a network; and
   processing the Ethernet Connectivity Fault Management messages at remote End Points to extract the attributes, wherein the processing comprises dynamic re-configuration responsive to changes in the network;
   wherein the Ethernet Connectivity Fault Management messages comprise Continuity Check Messages with the extensions contained therein to add general and sub messages to provide one or more of Media Access Control attributes and Pseudowire labels, and wherein the Continuity Check Messages utilize the extensions to provision line cards in the End Points in addition to performing Ethernet Connectivity Fault Management functions of monitoring and protection switching.

2. The method of claim 1, further comprising:
   updating a remote End Point responsive to the attributes.

3. The method of claim 1, further comprising:
   provisioning a service entity between a headend End Point to a remote End Point.

4. The method of claim 3, further comprising:
   updating the service entity at the remote End Point responsive to the attributes of the headend End Point.

5. The method of claim 4, wherein the attributes comprise a Media Access Control address for the headend End Point.

6. The method of claim 5, wherein the headend End Point comprises a head end node comprising a line card for operating the service entity; and the method further comprising:
   performing one of replacing the line card with a second line card and protection switching to the second line card;
   exchanging a second Ethernet Connectivity Fault Management message from the headend End Point to the remote End Point, wherein the message comprises a Media Access Control address for the second line card;
   processing the second Ethernet Connectivity Fault Management message at the remote End Point to extract the attributes; and
   updating the remote End Point responsive to the Media Access Control address for the second line card.

7. A network extending Ethernet Connectivity Fault Management, comprising:
   network termination equipment;
   a head end comprising a first line card, wherein the first line card is communicatively coupled to the network termination equipment over a layer two network; and an extension to Ethernet Connectivity Fault Management transmitted over the network to provide sharing of attributes between the network termination equipment and the head end, wherein the sharing of attributes provides for dynamic re-configuration responsive to changes in the network;

wherein the extension to Ethernet Connectivity Fault Management is contained in a Continuity Check Message and adds general and sub messages to provide one or more of Media Access Control attributes and Pseudowire labels, and wherein the Continuity Check Message utilizes the extension to provision line cards in end points in addition to performing Ethernet Connectivity Fault Management functions of monitoring and protection switching.

8. The network of claim 7, further comprising an element management system connected to the network termination equipment and the head end.

9. The network of claim 7, further comprising a service entity between the network termination equipment and the head end.

10. The network of claim 9, wherein the service entity is provisioned by the extension to Ethernet Connectivity Fault Management for hardware-related attributes.

11. The network of claim 10, wherein the hardware-related attributes comprise Media Access Control addresses.

12. A method, comprising:
creating a tunnel between a first node and a second node;
operating Ethernet Connectivity Fault Management between the first node and the second node;
exchanging the tunnel attributes between the first node and the second node using extensions of Continuity Check Messages transmitted over a network; and
revising the tunnel attributes responsive to the extensions of the Continuity Check Messages;
wherein the tunnel attributes provide for dynamic re-configuration responsive to changes in the network; and
wherein the extensions of Continuity Check Message add general and sub messages to provide one or more of Media Access Control attributes and Pseudowire labels and are utilized to provision line cards in end points in addition to performing Ethernet Connectivity Fault Management functions of monitoring and protection switching.

13. The method of claim 12, wherein an Ethernet Connectivity Fault Management service is identified by a Maintenance Association ID common to both ends of the tunnel and carried bidirectionally in the Continuity Check Messages.

14. The method of claim 13, further comprising:
at a local device, receiving a Continuity Check Message belonging to a provisioned Maintenance Association;
validating the received Continuity Check Message to determine a remote End Point and associated ID; and
discovering and continuously revising a variable comprising Media Access Control addresses of the remote End Point.

15. The method of claim 14, further comprising:
binding between the Maintenance Association and service entity.

\* \* \* \* \*